(12) United States Patent
Wade et al.

(10) Patent No.: US 11,506,954 B2
(45) Date of Patent: Nov. 22, 2022

(54) IMAGE BLUR CORRECTION APPARATUS; CAMERA DEVICE AND ELECTRONIC DEVICE

(71) Applicant: New Shicoh Motor Co., Ltd., Zhejiang (CN)

(72) Inventors: Tatsuki Wade, Yamato (JP); Kei Onodera, Yamato (JP)

(73) Assignee: NEW SHICOH MOTOR CO., LTD., Zhejiang (CN)

( * ) Notice: Subject to any disclaimer, the term of this patent is extended or adjusted under 35 U.S.C. 154(b) by 362 days.

(21) Appl. No.: 16/712,551

(22) Filed: Dec. 12, 2019

(65) Prior Publication Data

US 2020/0192191 A1    Jun. 18, 2020

(30) Foreign Application Priority Data

Dec. 12, 2018   (JP) .............................. JP2018-232338

(51) Int. Cl.
*G03B 13/34*      (2021.01)
*G02B 27/64*      (2006.01)
(Continued)

(52) U.S. Cl.
CPC .............. *G03B 13/34* (2013.01); *G02B 7/04* (2013.01); *G02B 27/646* (2013.01); *G03B 5/06* (2013.01); *G03B 2205/0023* (2013.01)

(58) Field of Classification Search
CPC .......... G03B 13/34; G03B 13/36; G03B 5/02; G03B 5/06; G03B 2205/0023;
(Continued)

(56) References Cited

U.S. PATENT DOCUMENTS 7,830,595 B2    11/2010  Hinata et al.
9,936,134 B2     4/2018  Enta
(Continued)

FOREIGN PATENT DOCUMENTS

JP    2007114737 A    5/2007
JP    2013125080 A    6/2013
(Continued)

OTHER PUBLICATIONS

Office Action (Notice of Reasons for Refusal) dated Feb. 1, 2022, by the Japanese Patent Office in corresponding Japanese Patent Application No. 2018-232338, and an English Translation of the Office Action. (6 pages).

*Primary Examiner* — Christopher E Mahoney
(74) *Attorney, Agent, or Firm* — Buchanan Ingersoll & Rooney PC

(57) ABSTRACT

An image blur correction apparatus includes a focus adjustment unit for moving a lens body in the direction of its optical axis; an image blur correction unit; and a housing having a housing front side wall on the front side of the direction of the optical axis and disposed outside said focus adjustment unit and the image blur correction unit, the focus adjustment unit has a focus adjustment unit front side wall on the front side of the direction of the optical axis, the focus adjustment unit front side wall including an exposed portion provided around the insertion hole and a hollow portion recessed toward the rear side of the direction of the optical axis with respect to said exposed portion; and the hollow portion and the rear side of the housing front side wall in the direction of the optical axis are provided to face opposite each other.

10 Claims, 6 Drawing Sheets

(51) Int. Cl.
*G02B 7/04* (2021.01)
*G03B 5/06* (2021.01)

(58) Field of Classification Search
CPC .... G03B 2205/0015; G03B 2205/0007; G02B 7/04; G02B 27/646; H04N 5/23248; H04N 5/2328; H04N 5/23287
See application file for complete search history.

(56) References Cited

U.S. PATENT DOCUMENTS

| | | | |
|---|---|---|---|
| 9,989,832 B2* | 6/2018 | Minamisawa | H04N 5/23258 |
| 2018/0252893 A1* | 9/2018 | Park | H02K 41/0356 |
| 2021/0329170 A1* | 10/2021 | Osaka | H04N 5/23241 |

FOREIGN PATENT DOCUMENTS

| | | |
|---|---|---|
| JP | 2013130822 A | 7/2013 |
| JP | 2015018268 A | 1/2015 |
| JP | 2016122055 A | 7/2016 |
| WO | 2015045791 A1 | 4/2015 |
| WO | 2018112436 A1 | 6/2018 |

* cited by examiner

IMAGE BLUR CORRECTION APPARATUS; CAMERA DEVICE AND ELECTRONIC DEVICE

CROSS-REFERENCE TO RELATED APPLICATION

This application claims priority to Japanese Patent Application No. 2018-232338 filed Dec. 12, 2018, the disclosure of which is hereby incorporated in its entirety by reference.

FIELD OF THE INVENTION

The present invention relates to an image blur correction apparatus for a camera device. Such image blur correction apparatus is designed for use with any electronic device such as the smartphone and the like. Also, the present invention relates to a camera device and an electronic device both having such image blur correction apparatus mounted thereon.

BACKGROUND

When using the camera device, sometimes image blur is caused. For example, image blur is caused when the camera device is shaken. As the system for correcting any image blurs caused in the camera device, various systems such as lens shifting system, sensor shifting system and the like are known to the prior art.

As one example, the image blur correction apparatus is disclosed in International Patent publication WO2015/045791. The image blur correction apparatus disclosed in WO2015/045791 includes a lens driving unit for focus adjustment and an image sensor which are combined together as one unit. And, employs a system in which the optical axis of the lens is inclined together with the image sensor.

SUMMARY OF THE INVENTION

For the structure of the conventional image blur correction apparatus, the front side of the lens driving unit for focus adjustment has its total surface except for the lens body covered by the cover of the image blur correction apparatus so that they are spaced away from each other with a particular gap or clearance therebetween. This increases the size of the image blur correction apparatus along the optical axis direction between the front and rear sides of the optical axis direction. In order to allow the conventional image blur correction apparatus to be mounted on any thin electronic device such as the smartphone, it is required that the size of the image blur correction apparatus along the optical axis direction should be reduced.

The present invention is intending to eliminate the problems of the prior art described above, and it is an object of the present invention to provide an image blur correction apparatus which can be mounted on any thin electronic device such as the smartphone and the like, a camera device and an electronic device both of which contain such apparatus therein and having a thin thickness.

The present invention provides an image blur correction apparatus that comprises:

a focus adjustment unit for moving a lens body in the direction of its optical axis;

an image blur correction unit for moving at least either of an image sensor having the surface upon which light is incident through said lens body or said focus adjustment unit and for thereby correcting any image blurs caused by the incident light falling on said image sensor; and a housing having a housing front side wall on the front side of the direction of said optical axis and disposed outside said focus adjustment unit and said image blur correction unit, wherein said focus adjustment unit has a focus adjustment unit front side wall on the front side of the direction of said optical axis;

said focus adjustment unit front side wall includes an exposed portion provided around the insertion hole through which the incident light falls upon said lens body and a hollow portion recessed toward the rear side of the direction of said optical axis with respect to said exposed portion; and said hollow portion and the rear side of said housing front side wall in the direction of said optical axis are provided to face opposite each other.

In accordance with the present invention, it is possible to provide an image blur correction apparatus which can be mounted on any thin electronic device such as the smartphone and the like. Also, it is possible to provide a camera device and an electronic device both of which contain such image blur correction apparatus therein and having a thin thickness.

One example of an embodiment of the present invention is now described by referring to the accompanying drawings.

BEST MODES OF EMBODYING THE INVENTION

First Embodiment

Figure 1:
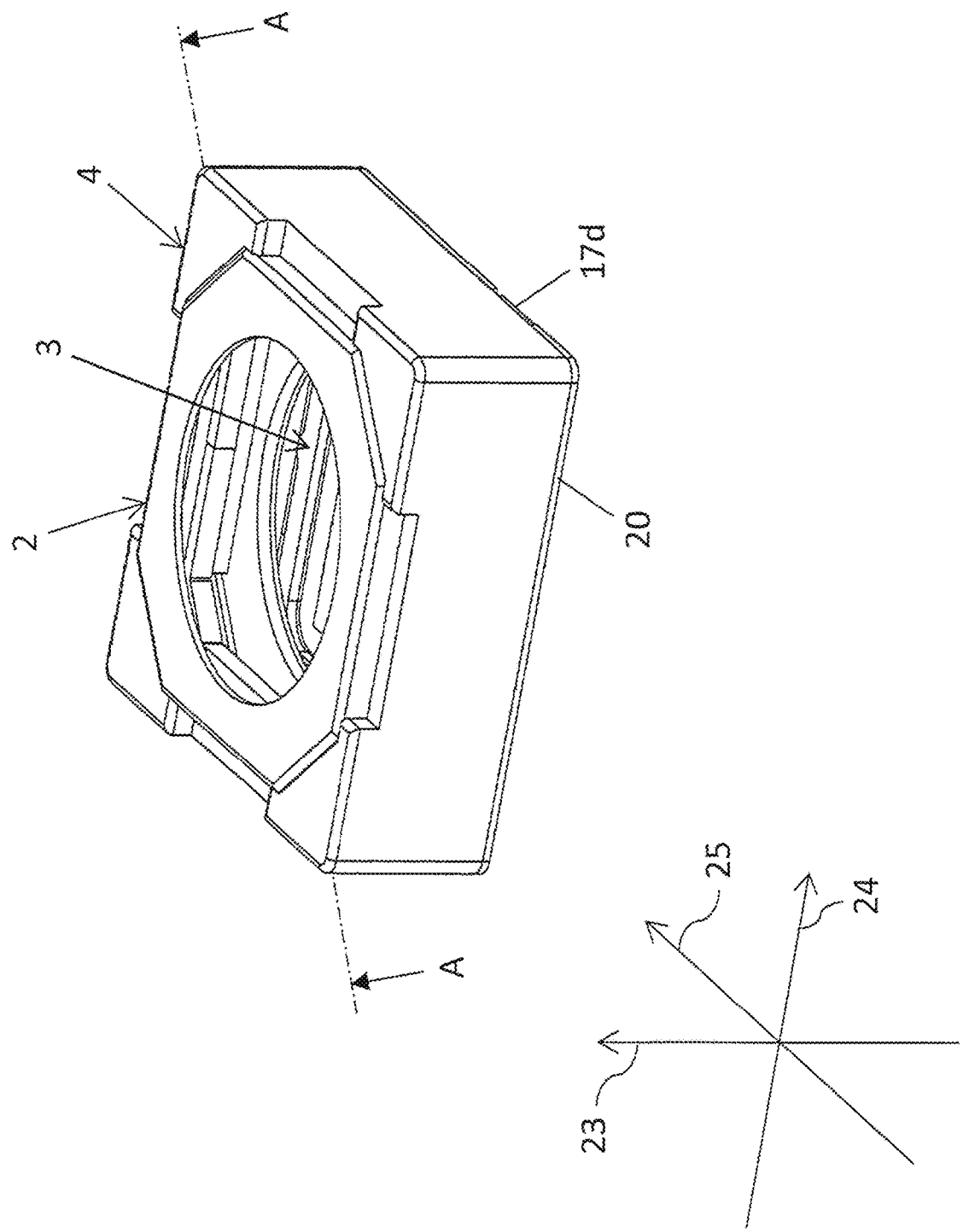
FIG. 1 is a perspective view illustrating one example of the first embodiment of the present invention.
Figure 2:
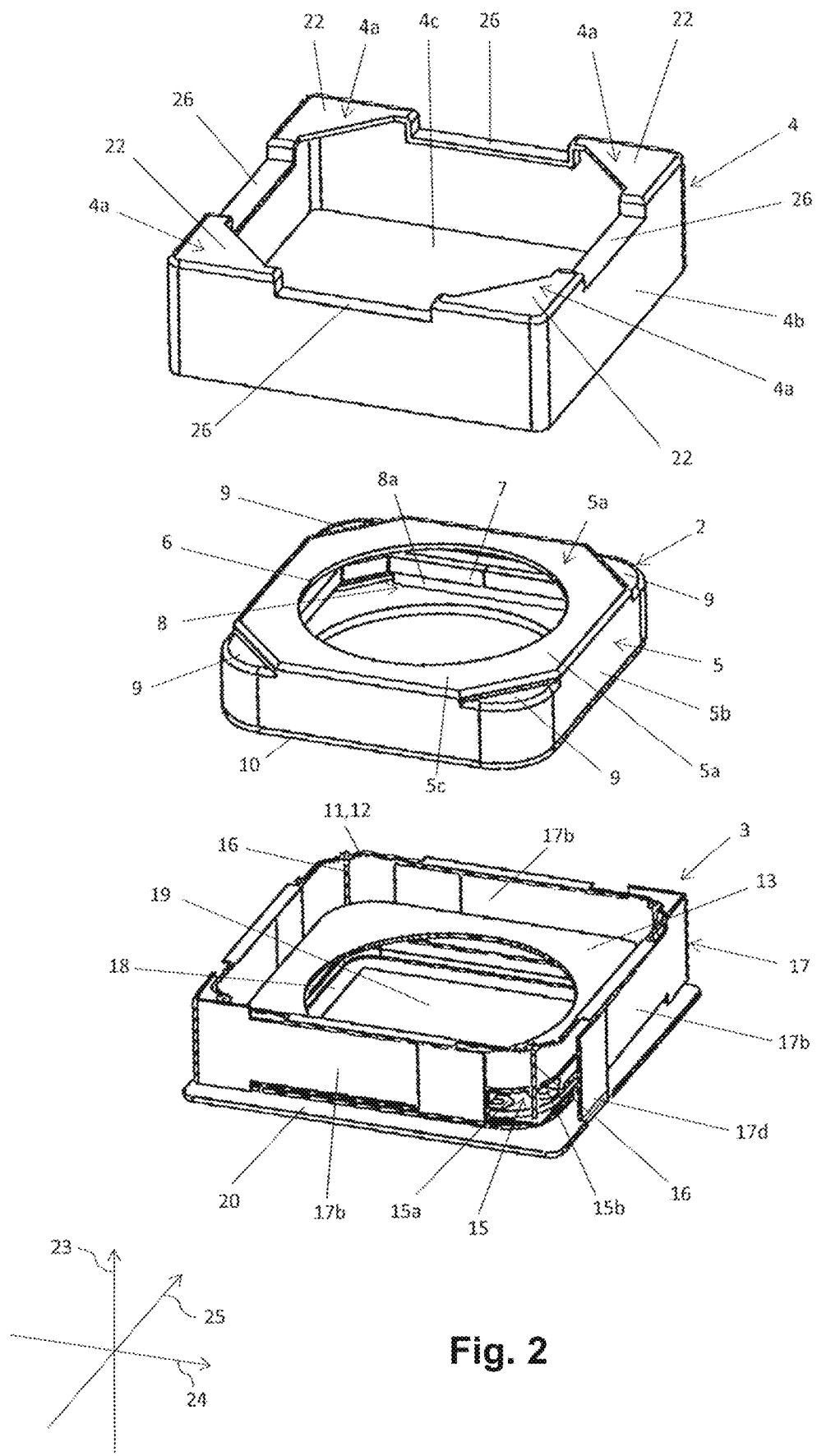
FIG. 2 is a partially exploded perspective diagram illustrating the image blur correction apparatus shown in FIG. 1.
Figure 3:
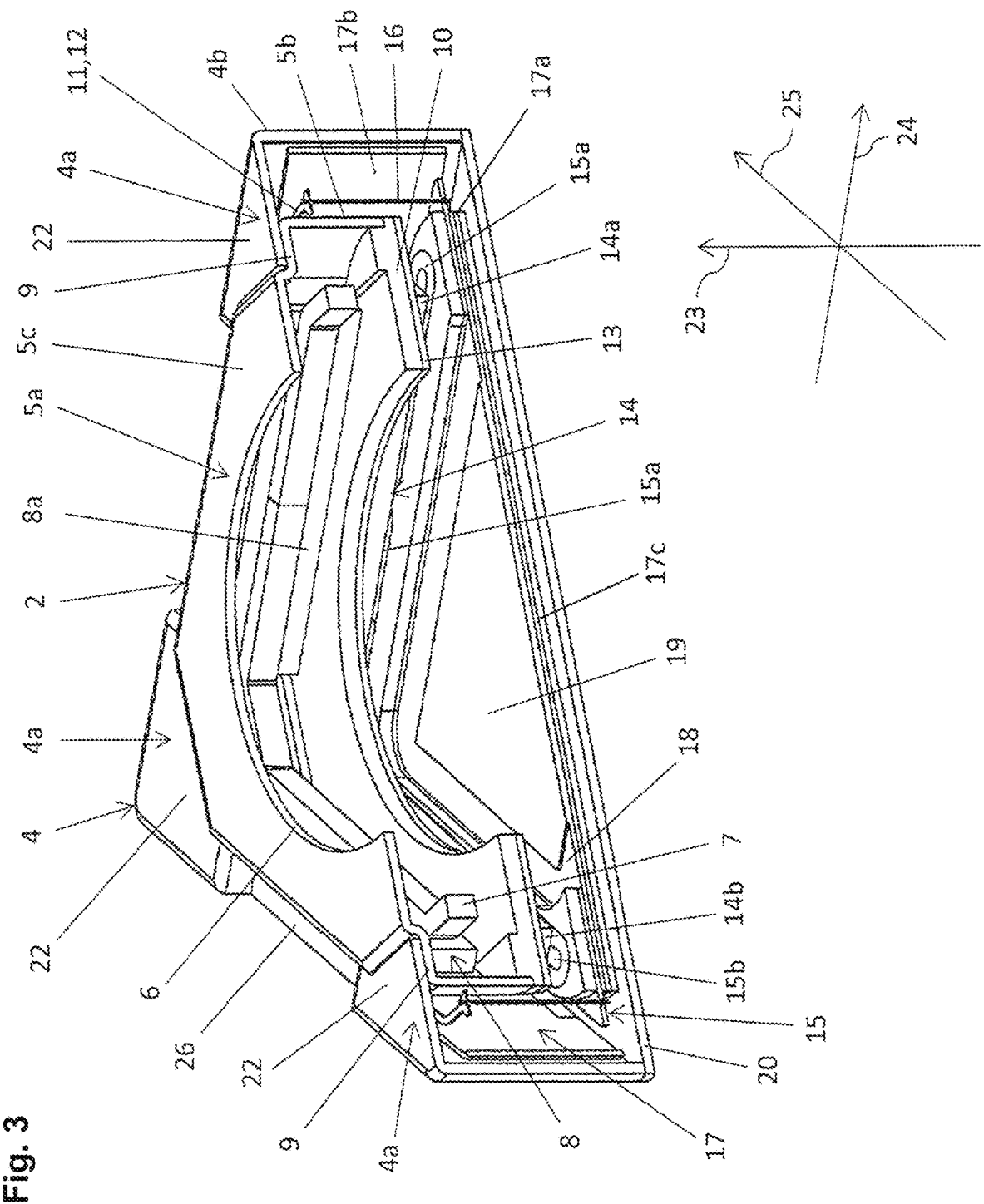
FIG. 3 is a sectional view of the image blur correction apparatus shown in FIG. 1 taken along A-A line thereof.

The image blur correction apparatus 1A includes a focus adjustment unit 2, an image blur correction unit 3 and a housing 4 as shown in FIGS. 1 through 3. The housing 4 has a housing front side wall 4a on the front side of the optical axis direction 23 to be described later and a bottom plate 20 disposed on the rear side of the optical axis direction 23. The housing 4 has a space portion formed between the housing front side wall 4a and the bottom plate 20, the space portion being provided for accommodating the focus adjustment unit 2 and the image blur correction unit 3 therein. The focus adjustment unit 2 is provided for causing the lens body (not shown) to be moved in the direction of the optical axis of the light through the lens body. In the current first embodiment, an image sensor 19 has a surface upon which light is incident through said lens body, and the image blur correction unit 3 is provided for causing said image sensor 19 to be moved in the direction orthogonal to said optical axis direction.

In the current first embodiment, the focus adjustment unit 2 includes a focus adjustment unit housing 5, a bottom plate 10, a focus adjustment coil portion 7, a focus adjustment magnet portion 8, a lens support member (not shown) and a plate spring (not shown) as shown in FIGS. 2 and 3.

In the current first embodiment, the image blur correction unit 3 includes a lead 11, a spring 12, a magnet fixing plate 13, an image blur correction magnet portion 14, an image blur correction coil portion 15, a wire member 16, a circuit board 17 or a substrate 18, and an image sensor 19 as shown in FIGS. 2 and 3.

In the following description and as shown in FIG. 1, the direction of the optical axis of the light though the lens body (not shown) and the direction normal to the surface of the image sensor 19 upon which light is incident are substantially coincident, which is defined as the optical axis direction 23. The direction intersecting with the optical axis direction 23 and the mutually intersecting directions are defined as the X-axis direction 24 and the Y-axis direction 25, respectively. In addition, the side on which the light is incident in the optical axis direction 23 (the upper side in FIG. 1) is defined as the front side and the side on which the image is formed (the lower side in FIG. 1) is defined as the rear side. The surface of the image sensor 19 upon which light is incident is a plane expanding in the X-axis direction 24 and in the Y-axis direction 25.

In the focus adjustment unit 2 according to the current first embodiment, the focus adjustment unit housing 5 has a focus adjustment unit front side wall 5a located on the front side of the optical axis direction 23 and an outer peripheral wall 5b extending from the outer side edge of the focus adjustment unit front side wall 5a toward the rear side, and is formed like a square-form box when it is viewed from the optical axis direction 23. The focus adjustment unit housing 5 may be made of any magnetic or nonmagnetic substance. The bottom plate 10 is formed like a square-form plate when it is viewed from the optical axis direction 23. The rear end of the outer peripheral wall 5b of the focus adjustment unit housing 5 is fixed to the outer side edge of the bottom plate 10. Thereby an internal space portion is formed. This space portion is provided for accommodating the lens support member (not shown) for said lens body therein.

The focus adjustment unit front side wall 5a of the focus adjustment unit housing 5 has an insertion hole 6 at the center through which light is passed toward the lens body. Around the insertion hole 6 on the focus adjustment unit front side wall 5a, there are an exposed portion 5c and a hollow portion 9 that is recessed from the exposed portion 5c toward the rear side of the optical axis direction 23. In the current first embodiment, it is shown in FIG. 2 that the hollow portion 9 is provided on each of the square-form corners of the focus adjustment unit front side wall 5a. In the space portion, the plate spring (not shown) is fixed to the rear side of each of the hollow portions 9. Said plate spring (not shown) supports the lens support member so that the lens support member can be moved in the optical axis direction 23.

The focus adjustment magnet portion 8 includes four (4) magnet pieces 8a, which are arranged around the inner peripheral wall of the focus adjustment unit housing 5 at predetermined intervals.

The focus adjustment coil portion 7 has a circular form that conforms to the inner peripheral form of the focus adjustment magnet portion 8 and is arranged around the outer peripheral wall of said lens support member so that it is spaced away from each of the magnet pieces 8a with a gap or clearance therebetween. When current flows through the focus adjustment coil portion 7, it produces an electromagnetic force that drives the lens support member on the focus adjustment unit 2 to move in the optical axis direction 23.

The housing 4 has a housing front side wall 4a located on the front side of the optical axis direction 23 and an outer peripheral wall 4b extending from the outer side edge of the housing front side wall 4a toward the rear side, and is formed like a square-form box when it is viewed from the optical axis direction 23. The housing 4 may be made of any magnetic or nonmagnetic substance. And the bottom plate 20 is also formed like a square-form box when it is viewed from the optical axis direction 23. The rear end of the outer peripheral wall 4b of the housing 4 is fixed to the outer side edge of the bottom plate 20. Thereby an internal space portion is formed. The housing front side wall 4a of the housing 4 has an insertion hole 4c at the center from which the exposed portion 5c is exposed on the focus adjustment front side wall 5a of the focus adjustment unit 2. The insertion hole 4c has the octagonal form when it is viewed from the optical axis direction 23. Each of the square-form corners on the housing front side wall 4a of the housing 4 has a triangular-form top plate portion 22. The top plate portion 22 is formed in the position in which the corresponding hollow portion 9 is formed. Between each of the top plate portions 22 on the housing front side wall 4a, there is a top plate gap portion 26 recessed behind the top plate portion 22.

The housing 4 and the focus adjustment unit 2 are combined together so that the hollow portion 9 on the focus adjustment unit 2 and the rear side of the housing front side wall 4a can face opposite each other. More specifically, the front side of the hollow portion 9 on the focus adjustment unit 2 and the rear side of the top plate portion 22 on the housing 4 are located to face opposite each other.

Next, the image blur correction unit 3 is now described. As shown in FIGS. 2 and 3, the metal-made spring 12 on the image blur correction unit 3 and the lead 11 made of FCP (Flexible Printed Circuit) are fixed to the rear side of the top plate gap portion 26. Electric power is supplied to the image blur correction coil portion 15 through the lead 11.

The spring 12 has the square and annular thin plate form, and each of the four sides has a widened part at the middle portion. Each of the four corners has a fixing hole for securing the corresponding wire member 16.

Like the spring 12, the lead 11 also has the square and annular thin plate form, and each of the four sides has a widened part at the middle portion. Each of the four corners has a fixing hole for securing the corresponding wire member 16. Although this is not shown, a coil connecting portion extends from the widened part toward the rear side of the optical axis direction 23. The coil connecting portion is exposed from the rear side of the side wall of the housing 4.

The widened part of the spring 12 is fixed to the rear side of the top plate gap portion 26 on the housing 4 through the widened part of the lead 11. Except for the respective widened parts, the spring 12 and the lead 11 are therefore held in the floating state in the air.

The circuit board or substrate 17 is made of FPC, and is provided for electrically connecting the image sensor 19 with any external devices. As shown in FIGS. 2 and 3, the circuit board or substrate 17 has a flat plate 17a and a side plate 17b. In the current first embodiment, the side plate 17b is rising from each of the two sides of the flat plate 17a facing opposite each other toward the front side of the optical axis direction 23 and extends in the X-axis direction 24 and in the Y-axis direction 25. The end portion 17*d* of each of the side plates 17*b* is fixed to the inner side of the side wall on the housing 4. It is shown in FIG. 1, the end portion 17*d* of each of the side plates 17*b* is exposed from the rear end of the side wall on the housing 4 to the outside. Instead of using the lead 11, the power may be supplied from the circuit substrate 17 to the image blur correction coil portion 15.

As shown in FIG. 3, the substrate 18 on which the image sensor 19 is mounted is fixed to the front side of the flat plate 17*a* and conducts electricity through each side plate 17*b*. In addition, the metal plate 17*c* is mounted to the rear side of the substrate 18. This metal plate 17*c* is provided for discharging any heat from the circuit substrate 17.

As shown in FIG. 3, the image blur correction coil portion 15 has the annular and square plate form when it is viewed from the optical axis direction 23, and is mounted to the front side of the substrate 18 surrounding the image sensor 19. In the current first embodiment, the image blur correction coil portion 15 includes one set of first coils 15*a*, 15*a* and one set of second coils 15*b*, 15*b* that are placed to surround the image sensor 19. Each of the first coils 15*a* and each of the second coils 15*b* are arranged alternately at an interval of 90 degrees with respect to the center of the image sensor 19. In addition, the first coil 15*a* and second coil 15*b* on each side each include two coil pieces. As shown in FIG. 3, each of the four corners on the image blur correction coil portion 15 has a fixing hole for securing the wire member 16. Those fixing holes are located outside the substrate 18.

The image blur correction magnet portion 14 includes first magnets 14*a* facing opposite the corresponding first coils 15*a* and second magnets 14*b* facing opposite the corresponding second coils 15*b*. In the current first embodiment, the image blur correction coil portion 14 includes one set of first magnets 14*a*, 14*a* and one set of second magnets 14*b*, 14*b*, each of those magnets having the square bar-like form when it is viewed from the optical axis direction 23, and is fixed to the rear side of the magnet fixing portion 13. The first magnets 14*a* are provided to face opposite the corresponding first coils 15*a* in the optical axis direction 23 and the second magnets 14*a* are provided to face opposite the corresponding second coils 15*b* in the optical axis direction 23. In addition, each of the first magnets 14*a* and each of the second magnets 14*b* are arranged alternately at an interval of 90 degrees with respect to the center of the image sensor 19.

When current flows through the first coil 15*a*, it produces an electromagnetic force that drives the substrate 18 having the image sensor 19 thereon to move in the Y-axis direction 25. When current flows through the second coil 15*b*, it produces an electromagnetic force that drives the substrate 18 having the image sensor 19 thereon to move in the X-axis direction 24. When current flows through the two coil pieces of each first coil 15*a* and each second coil 15*b* so that they can produce the mutually opposite electromagnetic forces, they drive the substrate 18 having the image sensor 19 thereon to rotate about the optical axis direction 23 acting as the axial direction.

In the current first embodiment, it is shown in FIG. 3 that the end portion of each wire member 16 on the front side of the optical axis direction 23 is fitted into the fixing hole for the lead 11 and into the fixing hole for the spring 12 and is secured therein. In this case, the wire member 16 will be electrically connected with the lead 11, but will not be electrically connected with the spring 12. In addition, the end portion of each wire member 16 on the rear side of the optical axis direction 23 is fitted into the fixing hole for the image blur correction coil portion 15 and is secured therein, allowing the wire member 16 to be electrically connected with the image blur correction coil portion 15. Each wire member 16 couples the housing 4 with the substrate 18 having the image sensor 19 thereon, and supports the substrate 18 having the image sensor 19 thereon so that it can move in the X-axis direction 24 and in the Y-axis direction 25 with respect to the housing 4.

In the current first embodiment, the front side of each hollow portion 9 on the focus adjustment unit 2 is fixed to the rear side of each top plate portion 22, and the front side of the magnet fixing plate 13 on the image blur correction unit 3 is fixed to the bottom plate 10 on the focus adjustment unit 2. More specifically, the image blur correction apparatus 1A is structured such that the focus adjustment unit 2 is fixed to the housing 4 at the hollow portion 9 and that the image blur correction unit 3 causes the image sensor 19 to move in the direction intersecting with the optical axis with respect to the focus adjustment unit 2.

In accordance with the image blur correction apparatus 1A of the current first embodiment, therefore, this makes it possible that the housing front side wall 4*a* of the housing 4 is located on the rear side by the amount of the level difference between the exposed portion 5*c* and the hollow portion 9 and by the amount of the conventional gap or clearance provided between the housing and the adjustment unit. This can make the front side of the exposed portion 5*c* substantially flush with the front side of the top plate portion 22 as shown in FIGS. 1 and 3. In this case, the level difference between the exposed portion 5*c* and the hollow portion 9 and the thickness of the housing 4 are substantially the same. This can reduce the size of the image blur correction apparatus 1A in the optical axis direction 23. The image blur correction apparatus 1A thus obtained becomes so thinner that it can be mounted on any thin electronic device such as the smartphone.

Figure 4:
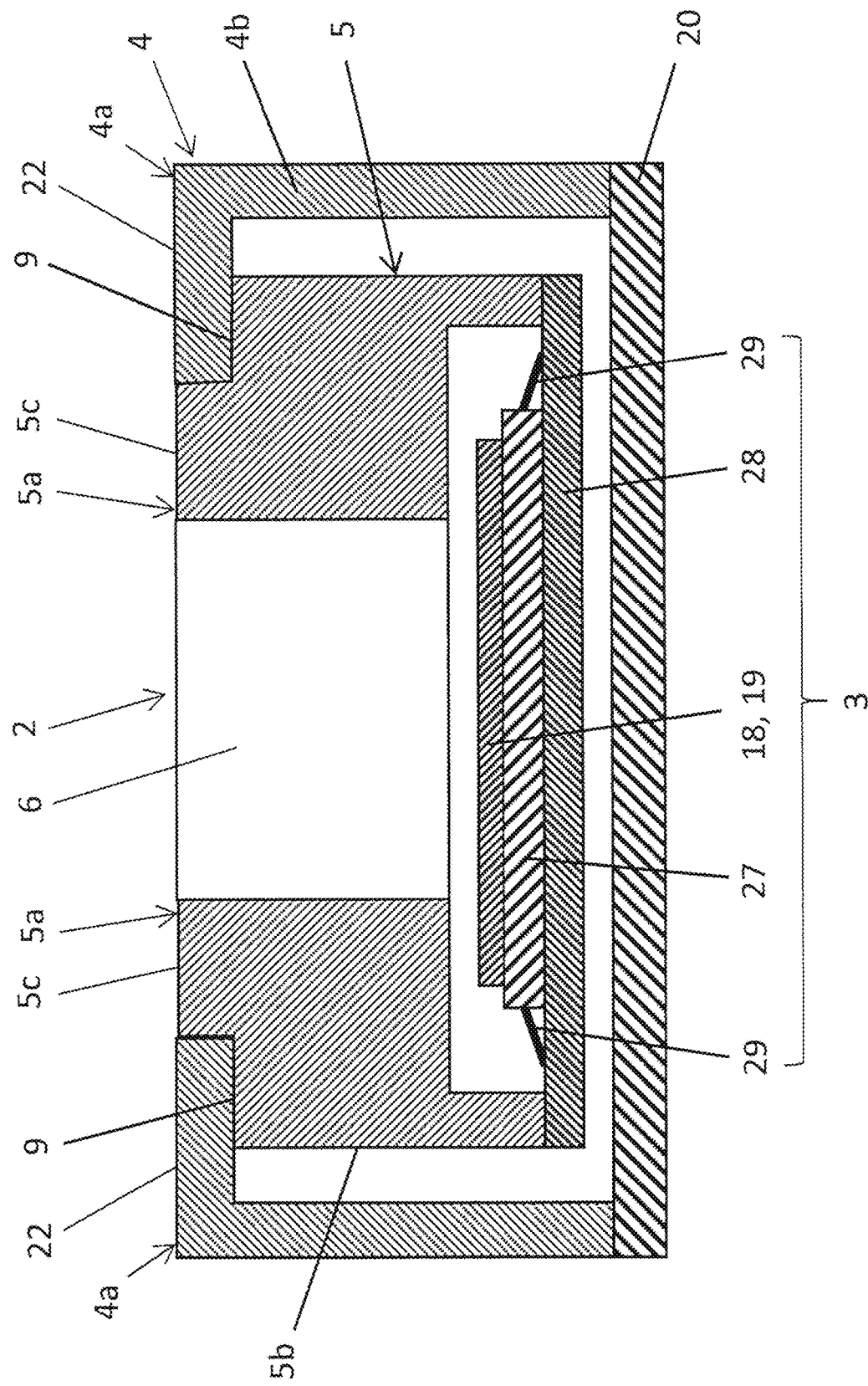
FIG. 4 is a sectional view illustrating a variation of the first embodiment of the present invention although some components of the structure are omitted.
Figure 5:
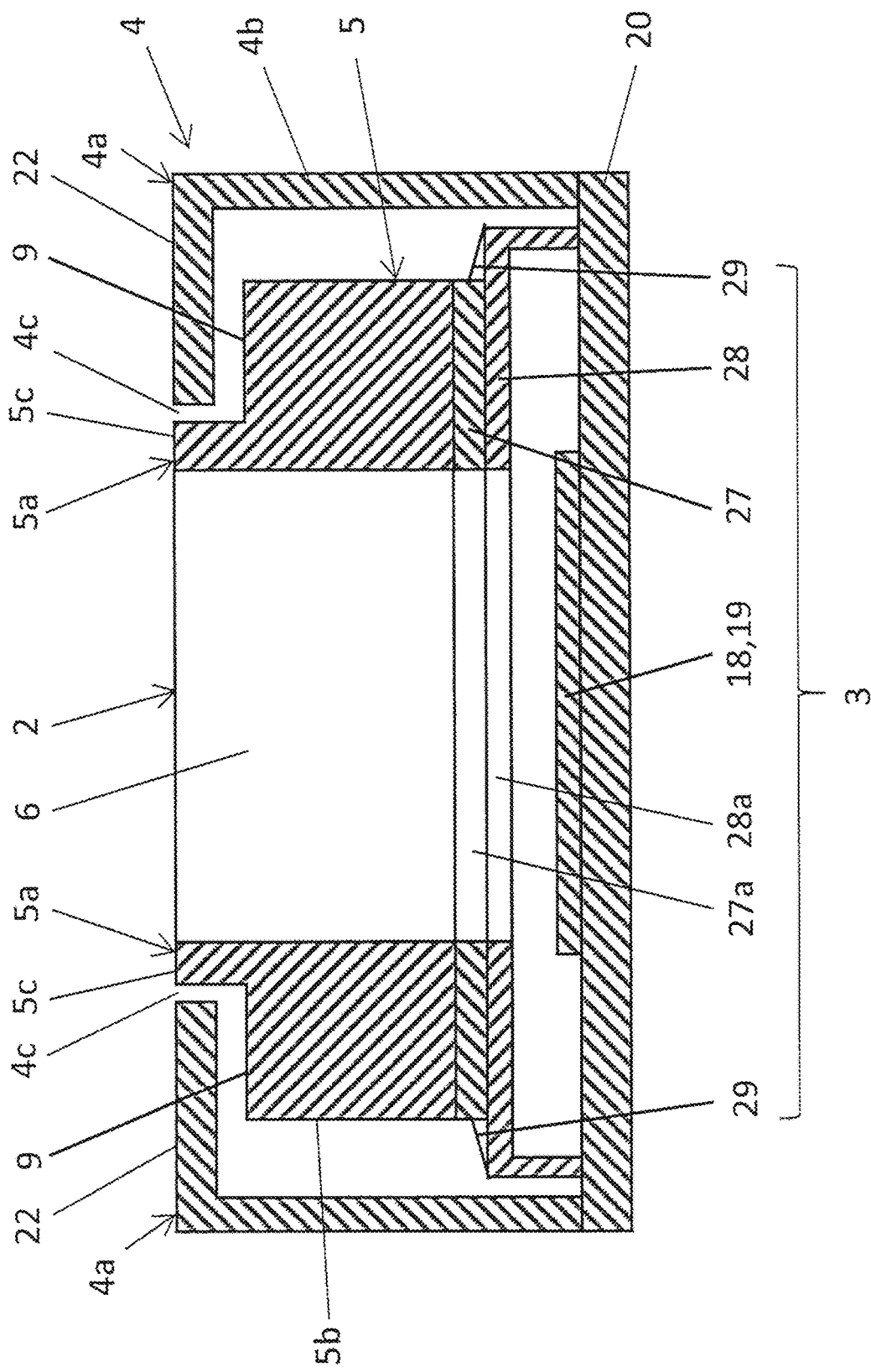
FIG. 5 is a sectional view illustrating one example of the second embodiment of the present invention although some components of the structure are omitted.
Figure 6:
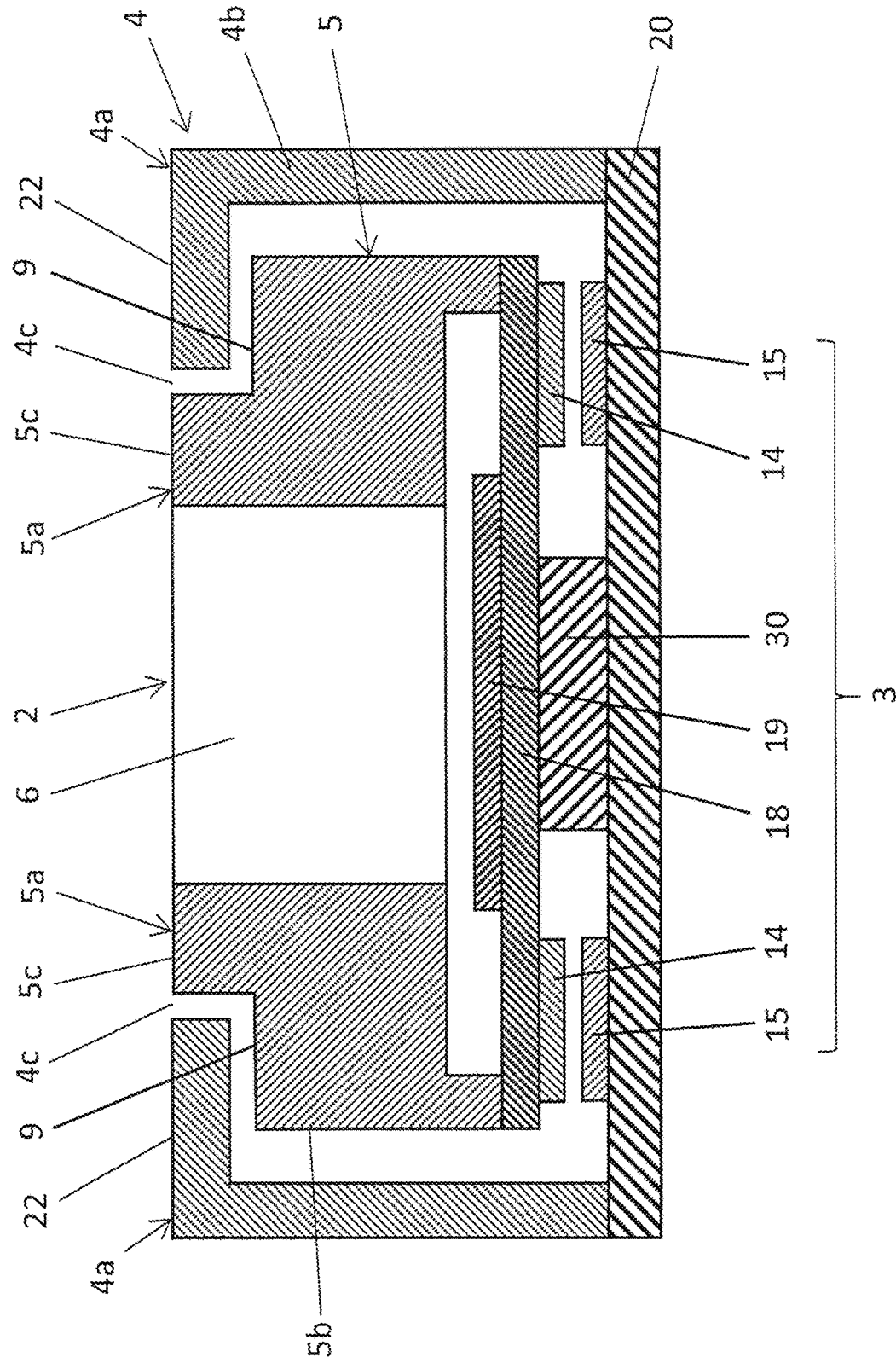
FIG. 6 is a sectional view illustrating one example of the third embodiment of the present invention although some components of the structure are omitted.

Next, the image blur correction apparatus 1B according to a variation of the first embodiment is now described by referring to FIG. 4. It should be noted, however, that although the focus adjustment unit 2 is shown in FIGS. 4 through 6, the detailed description of its internal structure is omitted except for the insertion hole 6. In this variation, the image blur correction magnet portion 14, the image blur correction coil portion 15 and the wire member 16 are not used. Instead, the SMA wire 29 is used. The SMA wire 29 is a flexible wire based on the shape memory alloy. This wire is capable of expanding and shrinking in response to any change in the temperature that may occur when current flows through the wire. Other parts or portions of the structure are the same as those of the image blur correction apparatus 1A described above.

As shown in FIG. 4, the housing 4 is fixed to the outer edge portion of the bottom plate 20, and the focus adjustment unit 2 is fixed in position with the front side of its hollow portion 9 facing opposite the rear side of the housing front side wall 4*a* of the housing 4. The image blur correction unit 3 is fixed to the rear end portion of the focus adjustment unit 2. The image blur correction unit 3 includes a fixing side base 28 fixed to the rear end portion of the focus adjustment unit 2, a placement base 27 sliding along the fixing side base 28 and four SMA wires 29 for coupling the fixing side base 28 with the placement base 27. The fixing side base 28 has the square form that is larger than the square form of the placement base 27. Each of the SMA wires 29 is disposed on each corresponding side of the square form. Specifically, one end of each SMA wire 29 is fixed to the outer peripheral end portion of the front side of the fixing side base 28, and the other end of each SMA wire 29 is fixed to the outer edge of the placement base 27. The four SMA wires 29 are spaced away from each other at an interval of 90 degrees. The substrate 18 having the image sensor 19 thereon is fixed to the front side of the placement base 27.

As each SMA wire 29 expands or shrinks in response to the current flowing through it, the image sensor 19 mounted on the substrate 18 will be moved straightforwardly together with the placement base 27 in the X-axis direction 24 and in the Y-axis direction 25 with respect to the fixing side base 28. Also, the image sensor 19 mounted on the substrate 18 will be rotated together with the placement base 27 about the optical axis direction 23 acting as the axial direction.

In accordance with the image blur correction apparatus 1B of this variation, therefore, this makes it possible that the housing front side wall 4a of the housing 4 is located on the rear side by the amount of the level difference between the exposed portion 5c and the hollow portion 9 and by the amount of the conventional gap or clearance provided between the housing and the adjustment unit. This can reduce the size of the image blur correction apparatus 1B in the optical axis direction 23. The image blur correction apparatus 1B thus obtained becomes so thinner that it can be mounted on any thin electronic device such as the smartphone.

Second Embodiment

The current second embodiment is now described by referring to FIG. 5. Those parts or portions which are common to those in the preceding embodiment and the variation thereof are given like reference numerals and are not described below.

In the current second embodiment, the focus adjustment unit 2 has the form that is similar to that of the focus adjustment unit 2 in the preceding embodiment. By using the similar SMA wires 29 used by the image blur correction unit 3 of the image blur correction apparatus 1B in the preceding embodiment, the image blur correction unit 3 causes the focus adjustment unit 2 to move in the direction orthogonal to the optical axis direction 23 with respect to the image sensor 19. The housing 4 has the form that is similar to that of the housing 4 in the preceding embodiment. It should be noted, however, that the top plate gap portion 26 can be eliminated and the level difference between the top plate gap portion 26 and the top plate portion 22 can also be eliminated.

The housing 4 is fixed to the outer edge portion of the bottom plate 20, and the substrate 18 having the image sensor 19 thereon is fixed to the front side of the bottom plate 20. In addition, the adjustment unit 3 is fixed to the front side of the image blur correction unit 3 and the image blur correction unit 3 is fixed to the front side of the bottom plate 20. It results from the above that the hollow portion 9 and the housing 4 are spaced away from each other with a predetermined gap or clearance therebetween. In the current second embodiment, the front side of the hollow portion 9 and the rear side of the housing front side wall 4a face opposite each other with a predetermined gap or clearance therebetween, and the housing front side wall 4a is also spaced away from the level difference portion between the exposed portion 5 of the adjustment unit housing 5 and the hollow portion 9 with a predetermined gap or clearance therebetween. By this, the image sensor 19 will be fixedly coupled with the housing 4.

The image blur correction unit 3 includes the fixing side base 28 and the placement base 27 sliding along the placement base 28, which are coupled together by means of the four SMA wires 29. The placement base 27 has the annular thin plate form and has an insertion hole 27a at the center through which light passes and is directed toward the image sensor 19. The fixing side base 28 has the box-like form and has an insertion hole 28a at the center through which light passes and is directed toward the image sensor 19, with a box-like rear side end portion being fixed to the bottom plate 20.

One end of each SMA wire 29 is fixed to the outer peripheral end portion on the front side of the fixing side base 28 and the other end of each SMA wire 29 is fixed to the outer edge of the placement base 27. The four SMA wires 29 are spaced away from each other at an interval of 90 degrees.

As each SMA wire 29 expands or shrinks in response to the current flowing through it, the focus adjustment unit 2 fixed to the placement base 27 will be moved together with the placement base 27 in the X-axis direction 24 and in the Y-axis direction 25.

In the image blur correction apparatus 1C according to the current second embodiment, the top plate portion 22 on the housing 4 is disposed so that it can be spaced away from the hollow portion 9 on the focus adjustment unit 2 and the level difference portion between the exposed portion 5c and the hollow portion 9 with a predetermined gap or clearance in the optical axis direction 23, in the X-axis direction 24 and in the Y-axis direction 25. This gap or clearance in the optical axis direction 23 is provided for keeping those portions clear of the housing 4 while the focus adjustment unit 2 is moving.

In accordance with the image blur correction apparatus 1C of the current second embodiment, this makes it possible that the housing front side wall 4a of the housing 4 is located on the rear side by the amount of the level difference between the exposed portion 5c and the hollow portion 9. This can reduce the size of the image blur correction apparatus 1C in the optical axis direction 23. The image blur correction apparatus 1C thus obtained becomes so thinner that it can be mounted on any thin electronic device such as the smartphone.

Third Embodiment

The current third embodiment is now described by referring to FIG. 6. Those parts or portions which are common to those in the first and second embodiments are given like reference numerals and are not described below.

In the current third embodiment, the image sensor 19 and the focus adjustment unit 2 are fixedly coupled together, and the image blur correction unit 3 causes the focus adjustment unit 2 to rotate together with the image sensor 19 in order to allow the optical axis to be inclined. The adjustment unit 3 is fixed to the bottom plate 20 and the housing 4 is also fixed to the bottom plate 30. In this case, the hollow portion 9 and the housing 4 are spaced away from each other with a predetermined gap or clearance therebetween. In the current third embodiment like the second embodiment, the front side of the hollow portion 9 and the rear side of the housing front side wall 4a are provided to face opposite each other with a predetermined gap or clearance therebetween, and the housing front side wall 4a is also spaced away from the level difference portion between the exposed portion 5c on the adjustment unit housing 5 and the hollow portion 9 with the predetermined gap or clearance therebetween.

The focus adjustment unit 2 has the same form as the focus adjustment unit 2 in the first embodiment, and is fixed to the substrate 18 having the image sensor 19 thereon.

The image blur correction unit 3 includes the image blur correcting magnet portion 14, the image blur correction coil portion 15 and a two-axis inclination support member 30. The two-axis inclination support member 30 is provided for supporting the substrate 18 so that it can be inclined with respect to the bottom plate 30. Its concept includes the so-called gimbals and the like.

The two-axis inclination support member 30 has its rear side fixed to the bottom plate 20 and its front side fixed to the substrate 18, and supports the substrate 18 so that it can be rotated around the X-axis direction 24 and around the Y-axis direction 25 with respect to the bottom plate 20. The image blur correction magnet portion 14 is fixed to the rear side of the substrate 18 with the image blur correction coil portion 15 being fixed to the front side of the bottom plate 20 so that it can face opposite the image blur correction magnet portion 14.

As current flows through the image blur correction coil portion 15, it produce an electromagnetic force in the optical axis direction 23 which drives the adjustment unit 2 and the image sensor 19 to be rotated together about the two-axis inclination support member 30 so that the optical axis can be inclined.

In the current third embodiment, the image sensor 19 and the focus adjustment unit 2 are fixedly coupled together. The image blur correction unit 3, which is fixed to the bottom plate 20 on the housing 4, then causes the image sensor 19 and the focus adjustment unit 2 to be rotated together so that the optical axis can be inclined. In the image blur correction apparatus 1D thus obtained, the top plate portion 22 on the housing 4 is spaced away from the hollow portion 9 and the level difference portion between the exposed portion 5c and the hollow portion 9 with the predetermined gap or clearance therebetween in the X-axis direction 24 and in the Y-axis direction 25. The gap or clearance in the X-axis direction 24 and in the Y-axis direction 25 is provided to allow the focus adjustment unit 2 to be rotated.

In accordance with the image blur correction apparatus 1D of the current third embodiment, this makes it possible that the housing front side wall 4a on the housing 4 is located on the rear side by the amount of the level difference between the exposed portion 5c and the hollow portion 9. This can reduce the size of the image blur correction apparatus 1D in the optical axis direction 23. The image blur correction apparatus 1D thus obtained becomes so thinner that it can be mounted on any thin electronic device such as the smartphone.

In the first, second and third embodiments described above, the electromagnetic force that drives the image blur correction unit 3 is produced by the combination of the image blur correction magnet portion 14 and the image blur correction coil portion 15 or by enabling the SMA wires 29 to expand and shrink in response to the applied current. This is presented as one example. The electromagnetic force may be obtained by the use of the piezoelectric element. As one example, the mechanism for supporting and guiding the image blur correction unit 3 is implemented by using the wire member 16, the SMA wires 29 and the two-axis inclination support member 30 like the gimbals. It may also be achieved by the use of the rolling member like balls or the guide shaft. In addition, it may also be achieved by the use of the pivot.

Although the driving force for the focus adjustment unit 2 is obtained by the electromagnetic force produced by the combination of the focus adjustment coil portion 7 and the focus adjustment magnet portion 8, which is presented as one example, it may be obtained by the use of the piezoelectric element or SMA. It may also be obtained by the structure in which the focus adjustment magnet portion 8 and the image blur correction magnet portion 14 can be used together.

The hollow portion 9 on the focus adjustment unit 2 is provided on each of the four square-form corners on the focus adjustment unit front side wall 5a. For example, it may be provided around the total circumference. With this, the housing front side wall 4a on the housing 4 facing opposite the hollow portion 9 may also be provided around the total circumference or may be provided only on each corner.

Embodiments for the Camera Device and the Electronic Device

Any of the image blur correction apparatuses 1A, 1B. 1C, 1D described above can be mounted on the camera device or any electronic device such as the smartphone. As described, any of the image blur correction apparatuses includes the focus adjustment unit 2, the image blur correction unit 3 and the housing 4 having the housing front side wall 4a. The focus adjustment unit 2 includes the focus adjustment unit front side wall 5a on the front side of the optical axis direction 23, and the focus adjustment unit front side wall 5a includes the exposed portion 5c provided around the insertion hole 6 through which the light is incident on the lens body and the hollow portion 9 recessed toward the rear side of the optical axis direction 23 with respect to the exposed portion 5c. The hollow portion 9 and the housing front side wall 4a face opposite each other. This makes it possible that the housing front side wall 4a on the housing 4 is located on the rear side by the amount of the level difference between the exposed portion 5c and the hollow portion 9. This can reduce the size of the image blur correction apparatus in the optical axis direction 23. The image blur correction apparatus thus obtained becomes so thinner that it can be mounted on any thin electronic device such as the smartphone. The camera device and the electronic device such as the smartphone according to the respective embodiments can become so thinner that any of the image blur correction apparatuses described above can be mounted thereon.

Although the present invention has been described with reference to several preferred embodiments thereof by referring to the accompanying drawings, it should be understood that the present invention is not limited to those embodiments and can be varied in various ways without departing from the spirit and scope of the invention as defined in the appended claims.

DESCRIPTION OF REFERENCE NUMERALS 1A, 1B, 1C, 1D image blur correction apparatus
2 focus adjustment unit
3 image blur correction unit
4 housing
4a housing front side wall
4b outer peripheral wall
4c insertion hole
5 focus adjustment unit housing
5a focus adjustment unit front side wall
5b outer peripheral wall
5c exposed portion
6 insertion hole
7 focus adjustment coil portion
8 focus adjustment magnet portion
8a magnet piece 9 hollow portion
10 bottom plate
11 lead
12 spring
13 magnet fixing plate
14 image blur correction magnet portion
14a first magnet
14b second magnet
15 image blur correction coil portion
15a first coil
15b second coil
16 wire member
17 circuit substrate
17a flat plate
17b side plate
17c metallic plate
17d end portion
18 substrate
19 image sensor
20 bottom plate
22 top plate portion
26 top plate gap portion
27 placement base
27a insertion hole
28 fixing side basa
28a insertion hole
29 SMA wire
30 two-axis inclination support member

What is claimed is:

1. An image blur correction apparatus that comprises:
a focus adjustment unit for moving a lens body in a direction of its optical axis;
an image blur correction unit for moving at least either of an image sensor having a surface upon which light is incident through said lens body or said focus adjustment unit and for thereby correcting any image blurs caused by the incident light falling on said image sensor; and
a housing having a housing front side wall on a front side of the direction of said optical axis and disposed outside said focus adjustment unit and said image blur correction unit, wherein
said focus adjustment unit has a focus adjustment unit front side wall on the front side of the direction of said optical axis; said focus adjustment unit front side wall includes an exposed portion provided around an insertion hole through which the incident light falls upon said lens body and a hollow portion recessed toward a rear side of the direction of said optical axis with respect to said exposed portion,
said hollow portion and a rear side of said housing front side wall in the direction of said optical axis are provided to face opposite each other; and
said focus adjustment unit is directly fixed to a rear side surface of said housing front wall of said housing at a front side surface of said hollow portion and said image blur correction unit is configured to cause said image sensor to be moved in the direction orthogonal to said optical axis with respect to said focus adjustment unit.

2. The image blur correction apparatus as defined in claim 1, wherein said image blur correction unit is provided to cause said image sensor to be rotated axially about said optical axis direction with respect to said focus adjustment unit.

3. The image blur correction apparatus as defined in claim 1, wherein said hollow portion and said housing are spaced away from each other with a
predetermined gap or clearance therebetween, said image sensor is fixedly coupled to said housing, and said image blur correction unit causes said focus adjustment unit to be moved in the direction orthogonal to said optical axis with respect to said image sensor.

4. The image blur correction apparatus as defined in claim 1, wherein said hollow portion and said housing are spaced away from each other with a
predetermined gap or clearance therebetween, said image sensor and said focus adjustment unit are fixedly coupled to each other and said image blur correction unit causes the optical axis of said lens body to be inclined.

5. The image blur correction apparatus as defined in claim 1, wherein
the front side of said exposed portion in the direction of said optical axis and the front side of said housing front side wall in the direction of said optical axis facing opposite said hollow portion are flush with each other.

6. The image blur correction apparatus as defined in claim 1, wherein
said focus adjustment unit has a square form when it is viewed from the direction of said optical axis, and said hollow portion is provided on each of the four corners.

7. The image blur correction apparatus as defined in claim 6, wherein said housing has the square form when it is viewed from the direction of said optical
axis, and the rear side of said housing front side wall in the direction of said optical axis faces opposite said hollow portion at each of the four corners of said housing front side wall.

8. The image blur correction apparatus as defined in claim 6, wherein
said focus adjustment unit has a focus adjustment unit housing, said focus adjustment unit housing having a space portion formed to accommodate said lens body therein and including said insertion hole, said exposed portion and said hollow portion.

9. A camera device that contains the image blur correction apparatus as defined in claim 1.

10. An electronic device that contains the camera device as defined in claim 9.

* * * * *